United States Patent Office 2,978,280
Patented Apr. 4, 1961

2,978,280

MOVEMENT OF GRANULAR SOLIDS INTO OR OUT OF HIGH PRESSURE VESSELS

John G. Mitchell, Larchmont, N.Y., assignor to Socony Mobil Oil Company, Inc., a corporation of New York Filed Oct. 30, 1959, Ser. No. 849,853

9 Claims. (Cl. 302—53)

This invention relates to the transfer of particle-form material from a zone at one pressure to a zone at a substantially different pressure. It is particularly concerned with hydrocarbon conversion processes in which a granular contact material or catalyst is moved continuously through zones maintained at substantially different pressures.

Many known processes use particle-form solid material which is conveyed or passed through gas-solids contacting vessels as catalytic material, heat transfer material, etc. Typical of such processes is the moving bed hydrocarbon conversion process in which a granular particulate material is passed as a gravitating compact bed through a reaction zone where it is contacted with hydrocarbons properly prepared for treatment and then through a regeneration zone as a compact gravitating bed where it is contacted with air to burn carbonaceous contaminant from the material and render the material in proper condition and at proper temperature for reuse in the reactor. The reactor is maintained at elevated pressures such as 10–100 p.s.i. (gauge) or more. The regenerator is generally maintained at atmospheric pressure as a safety precaution as well as a convenience in handling the large volumes of air involved. The reactor may be at a temperature of 800–1000° F. whereas the regenerator or kiln may be at temperatures of the order of 900–1400° F.

The contact material may be a synthetic material such as silica, alumina, chromia, zirconia or combinations of these and other materials in the form of pellets, pills, balls or irregular-shaped granular particles. The size may range over a wide range, depending upon the particular process involved. Many processes use particles of about 3–100 mesh Tyler. For instance, the TCC process for cracking hydrocarbons utilizes a size range of about 4–12 mesh Tyler. Since the TCC is a cracking process a cracking catalytic material, such as silica-alumina, is used. A variety of natural or treated clays are also used in these processes, such as bentonite, kaolin and montmorillonite.

It has always been a problem in these processes to transfer the contact material between the zones at different pressures without damaging the contact material. Valves, pressuring chambers and mechanical feeders of all types have been considered but are found unsatisfactory. This is particularly true in the TCC process, since it is essential to prevent the formation of fine particles caused by attrition or breakage of the catalyst. These fine particles interfere with the uniform flow of gas through the compact beds and are for this reason, as well as others, highly undesirable. Mechanical valves and flow control apparatus have been found to cause excessive attrition and breakage and hence are not generally used.

In order to introduce catalyst into the high pressure reactor of the TCC process, an elongated gravity feed leg is provided above the reactor and the material is gravitated continuously through this leg to gradually build up the pressure to reactor pressure. The catalyst feeds smoothly and continuously into the reactor as long as the leg has sufficient length to overcome the pressure differential. Unfortunately, the scheme requires about 4–5 feet of leg for each pound of pressure differential and hence is only practical for modest pressure differentials, such as about 10 p.s.i. In order to feed catalyst into a reactor maintained at 50 p.s.i. (gauge) the leg would have to be 250 feet tall and this is impractical. It is undesirable to have this limitation on reactor pressure and hence considerable work has been done over recent years to provide a way of introducing contact material or catalyst into a reactor at elevated pressure which would not require the tall structure required by the gravity feed leg but which would, like the gravity feed leg, permit movement of catalyst into or out of a high pressure vessel without mechanical sealing or flow interrupting devices which damage the catalyst and wear rapidly because of the abrasive action of the catalyst. The height of these units is often made higher than necessary by the fact that the granular particles must be moved laterally as well as downward. Since the granular material is less effective as a seal when passed through sloping conduits the column must therefore be lengthened to insure adequate seal characteristics. No satisfactory arrangement has previously been provided for lateral movement of the catalyst in these systems without requiring additional height of the already excessively tall structure.

The object of this invention is to provide a method or apparatus for transferring a particle-form solid material into or out of regions of substantially elevated pressure with minimum damage.

A further object of this invention is to provide a method or apparatus for introducing or withdrawing contact particles from a high pressure vessel which permits lateral movement of the contact particles and does not require substantial vertical transfer.

A further object of this invention is to provide a method or apparatus for introducing granular catalyst into a high pressure reactor which works smoothly without valves or baffles in the catalyst line and permits lateral movement of the catalyst without requiring excessive elevation.

A further object of this invention is to provide a method and apparatus for continuous lateral movement of particle-form solid material into or out of a high pressure region without requiring substantial elevation while maintaining a gas seal to prevent the escape of gas from this high pressure region.

These and other objects will be clearly understood from a study of the attached figures and a review of the following detailed discussion of the invention which refers from time to time to these figures.

In one aspect, this invention involves the downward transfer of granular material through passages arranged in a laterally spaced arrangement and terminated in separate chambers below a level of liquid having a density substantially greater than the granular material by the continuous concurrent flow of streams of the liquid. Within the separate chambers the material rises and is lifted out of the liquid by the substantial density differential to discharge onto the top of the adjacent passage and finally to a discharge outlet from the final chamber. The liquid is withdrawn from the lower portion of the separate chambers substantially below the lowest level to which the granular material penetrates in the chambers and is pumped back to the separated passages for reuse in each passage at a flow rate controlled by the rise or fall of the level of granular material in that particular chamber to insure that particles do not penetrate in the liquid below a predetermined level. A seal gas is supplied to the top of the highest pressure chamber and gas is in turn transferred from that chamber to each succeeding chamber at a controlled rate to maintain a predetermined pressure differential between each chamber.

Figure 1:
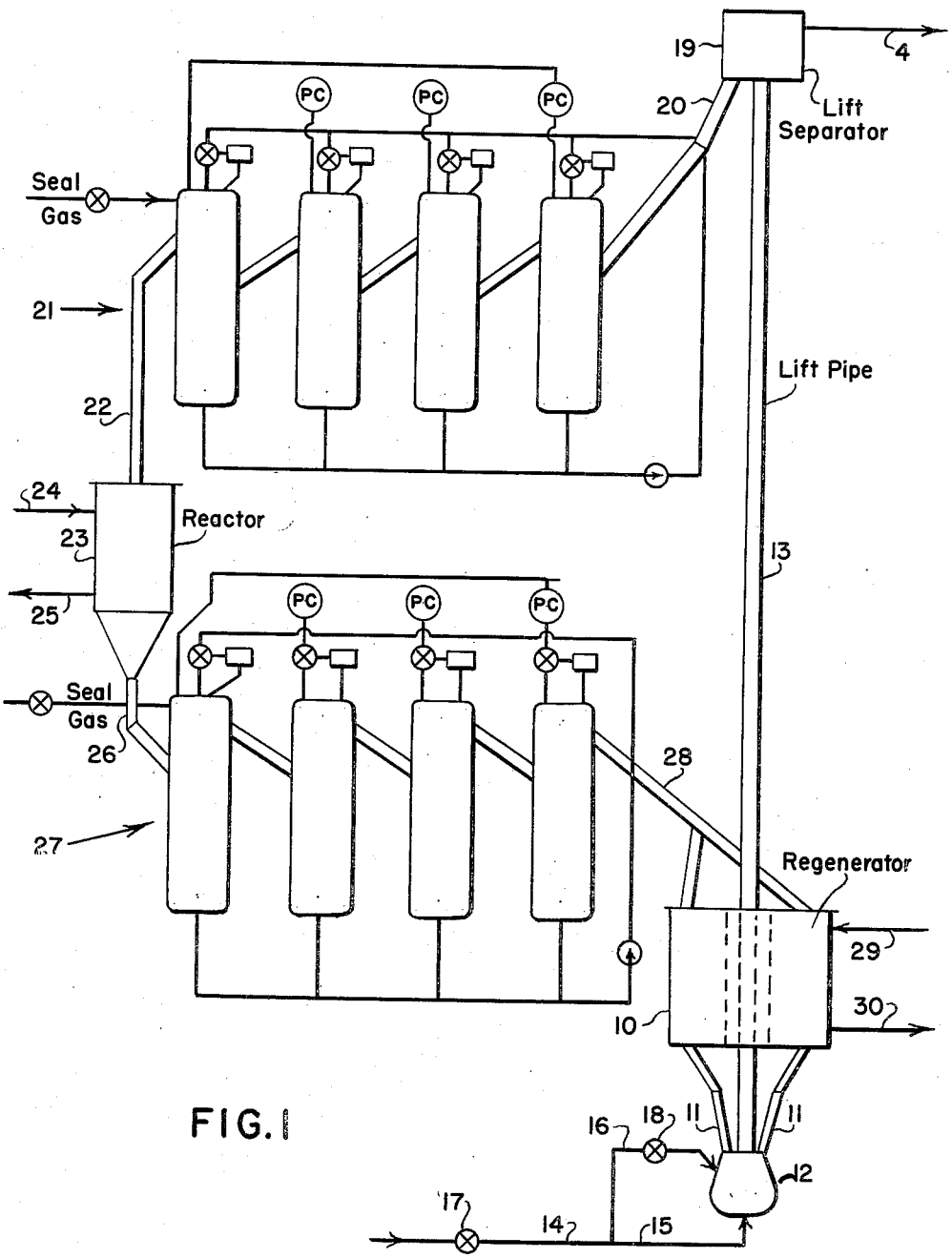
Figure 1 is a highly diagrammatic representation of a moving bed hydrocarbon conversion system, such as a high pressure TCC system.

In order to illustrate the invention, it will be disclosed in relation to a continuous moving bed process for cracking hydrocarbons, it being understood that the invention will have broad application to related processes where similar solids movement problems are involved. Referring now to Figure 1, a granular cracking catalyst is removed from the regenerator 10 through conduits 11 and introduced into a lift pot 12 for elevation through a pneumatic lift 13. A lift gas is introduced into the lift pot through conduits 14, 15 and 16, the flow rate being adjusted by the valves 17 and 18 to provide the desired catalyst flow through the lift pipe 13. The lift gas and catalyst are separated in the lift separator 19, the gas being discharged through the conduit 4 to the atmosphere.

The separated catalyst is gravitated through the conduit 20 into the pressure transfer device 21 which is subsequently disclosed in greater detail with respect to Figure 2. It is sufficient to note at this point that the catalyst travels through the laterally arranged vessels and is discharged from the transfer device 21 at substantially the same elevational level as the point of entry but at a location substantially removed therefrom in a horizontal direction. The catalyst is then passed through the conduit 22 into the reactor 23. The reactor is maintained at a substantially elevated pressure, this system being particularly adapted for maintenance at pressures over 50 p.s.i. (gauge) and even such pressures as 100–200 p.s.i. (gauge) This may be a high pressure cracking reaction or may involve a high pressure reforming reaction in which gasoline stock is charged to the reactor and a rearrangement of the structure of the molecules is effected at very high pressure to provide improved quality gasoline with minimum coke laydown. The hydrocarbons prepared for treatment are introduced through the conduit 24 and the products formed thereby are withdrawn through the conduit 25. The spent catalyst is withdrawn from the reactor through the conduit 26 into the pressure transfer device 27, which effects a reduction of pressure from the high reactor pressure as well as a lateral transfer of the contact material without a loss in height. The spent catalyst is then gravitated through the conduit 28 into the regenerator 10.

The catalyst is gravitated as a compact mass through the regenerator where it is contacted with air introduced into the vessel through the conduit 29. The contaminant is burned from the catalyst and the flue gas formed thereby is withdrawn through the conduit 30.

Figure 2:
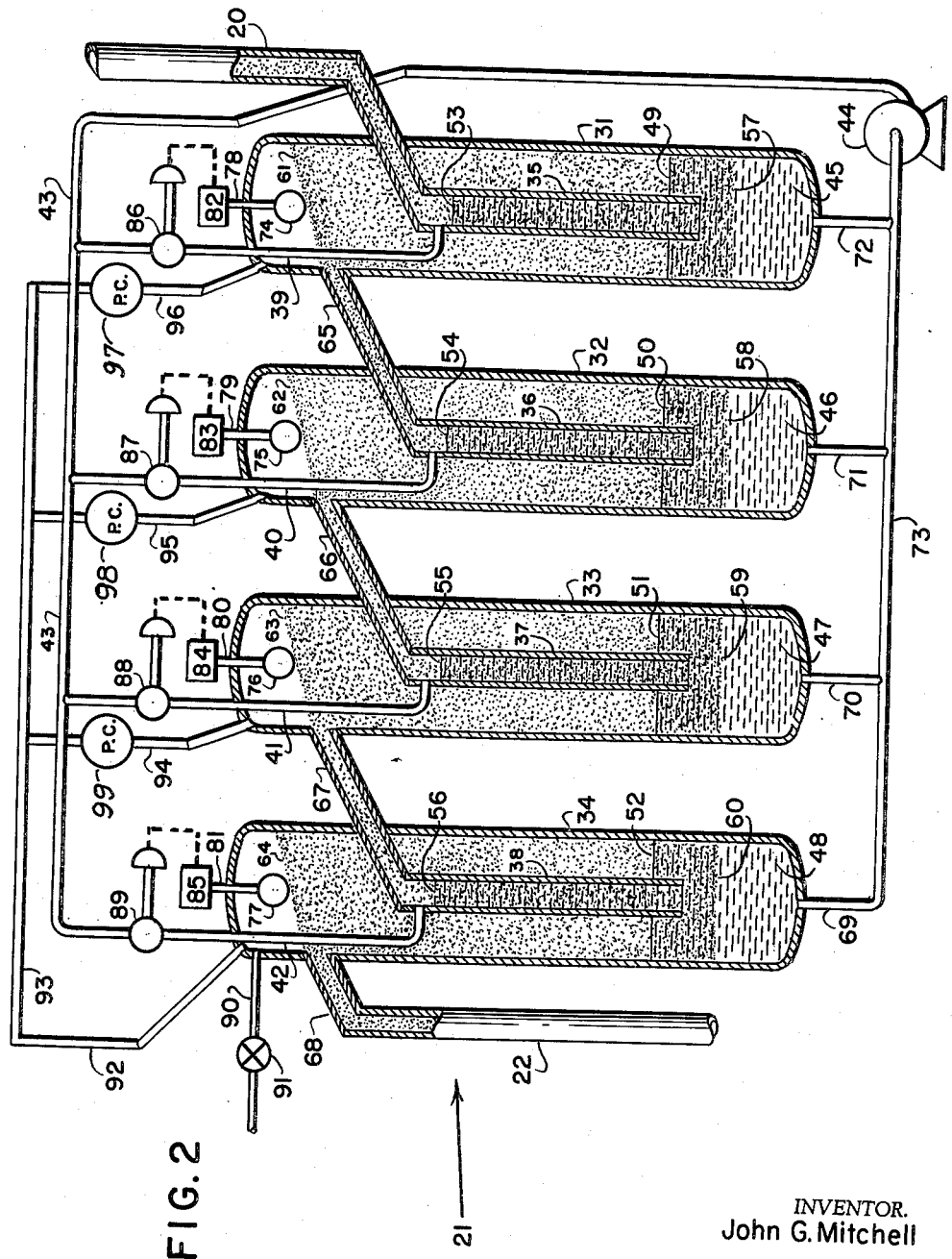
Figure 2 is an elevation in vertical section of the feeding apparatus of this invention used to introduce granular material into a high pressure zone or alternatively withdraw material therefrom.

Referring now to Figure 2, the pressure transfer device 21 is shown in more detail. A series of elongated vertical vessels 31, 32, 33 and 34 are shown in side-by-side relationship. Within these vessels are vertical conduits 35, 36, 37 and 38, which are terminated short of the top of the vessels and substantially above the bottom of the vessels. The conduit 20 communicates with the upper end of the first vertical conduit 35. The conduits 39, 40, 41 and 42 are attached to the upper end of the vertical conduits 35, 36, 37 and 38 to deliver heavy liquid at the required flow rate from the header conduit 43. The pump 44 supplies the required amount of heavy liquid to the header conduit 43. The feasibility of admixing heavy liquid with contact catalyst has been previously demonstrated in U.S. Patents 2,268,535; 2,357,694; 2,370,950; 2,453,458; and 2,547,015. Various liquids, such as molten lead, mercury, tin and molten alloys are found satisfactory. The heavy liquid travels concurrently with the granular material or catalyst through the conduits 35, 36, 37 and 38 to the lower ends thereof at a flow rate sufficient to carry the catalyst into the liquid pools 45, 46, 47 and 48 located at the bottom of the vessels 31, 32, 33 and 34. The liquid levels are shown at 49, 50, 51 and 52 in the vessels 31—34 but the liquid level in the vertical conduits is indicated by 53, 54, 55 and 56 at substantially higher elevations. This is brought about by the substantial pressure differential between the inlet and outlet of each of vessels 31—34. When withdrawing contact material from a high pressure vessel these liquid levels are reversed. It is seen that the particles penetrate the liquid to levels 57, 58, 59 and 60 and are lifted upwardly therefrom by the substantial differential in density between the heavy liquid and the solids. The solids rise as a compact mass in each vessel out of the liquid to levels 61, 62, 63 and 64 and flow from these levels laterally at an angle of repose of about 30° with the horizontal to discharge conduits 65, 66, 67 and 68. These discharge conduits can be at an angle of about 45° with the horizontal to insure adequate flow. They can be at a higher angle but of course this would not provide as rapid lateral movement. Thus, in vessel 31 the catalyst travels downwardly through conduit 35 and upwardly in the vessel to the lateral conduit 65 and then downwardly through conduit 36 in vessel 32 and upwardly in this vessel to the lateral conduit 66. The catalyst travels downwardly through conduit 37 in vessel 33 and upwardly in the vessel to the lateral conduit 67 into the next vessel. The catalyst travels downwardly in conduit 38 and upwardly in the vessel 34 to the lateral conduit 68. Considerable flexibility is, therefore, provided in obtaining lateral movement of the catalyst without loss of height and without the use of valves or lock chambers or similar troublesome devices. The catalyst finally gravitates through conduit 22 as previously described.

The molten liquid is withdrawn from the bottom of the vessels through the conduits 69, 70, 71 and 72 to the header conduit 73 which communicates with the intake side of pump 44. The liquid pools are deep enough so that the liquid is withdrawn substantially below the level of maximum penetration of the catalyst and hence only liquid is removed through the conduits 69—72. This is a decided advantage in systems of this type since the particles are highly abrasive and would rapidly damage the pump 44 if transferred with the liquid. Floats 74, 75, 76 and 77 are provided at the top of the noses of catalyst in each vessel and are connected with levers 78, 79, 80 and 81 to control boxes 82, 83, 84 and 85. These control boxes automatically adjust the valves 86, 87, 88 and 89 in the heavy liquid conduits 39—42 to provide the necessary flow rate of heavy liquid to maintain the level of the catalyst mass constant in each vessel. By preventing the catalyst from rising in the vessels above a predetermined maximum level, the controllers prevent catalyst from being forced to the bottom of the vessels and out with the heavy liquid being withdrawn from the bottom thereof. The controllers similarly insure that the catalyst level remains high enough in each vessel to transfer by gravity to the next adjacent vessel at the required flow rate as determined by the moving bed system being served.

An inert gas is introduced through the conduit 90 by the valve 91 at a pressure substantially equal to that in the high pressure vessel being served. A gas transfer system is provided by conduit 92 and header conduit 93 to supply gas to the remaining vessels through feeder conduits 94, 95 and 96. The pressure controllers 97, 98 and 99 are adjusted to maintain substantially uniform pressure drops between adjacent vessels so that only a proportionate increment of the total pressure is taken across each vessel. This system avoids overloading any single vessel to the point where heavy liquid seal may be lost. Obviously, in withdrawing catalyst from a high pressure vessel this gas pressure control system is reversed.

*Example*

The invention is illustrated in conjunction with a moving bed system, circulating 50 tons per hour of catalyst through a 180 p.s.i. (gauge) reactor and a 0 p.s.i. (gauge) kiln. The catalyst for the system is granular catalyst of size 4–12 mesh Tyler screen analysis. The loose density of this catalyst is about 43 lbs./ft.$^3$ with 50% void space. The catalyst is transferred to the reactor at about 875° F. and passed through a liquid seal device similar to that shown on Figure 2 for pressure increase and lateral transfer without loss of height. The vertical passageways are 8" standard pipe to handle the catalysts flow and each vessel has a diameter of 3 ft. 3 in. and a height of 28 ft. The pressure maintained at the top of each vessel is 45, 90, 135 and 180 p.s.i. (gauge). The heavy liquid used is lead with a density of 650 lbs./ft.$^3$. About 155 gal. per min. of lead is circulated through each vessel to maintain the desired flow rate. The difference between the liquid level in the vertical conduits and in the vessel proper is about 13.5 ft. The mass of catalyst in each vessel projects downwardly in the lead pool 3 ft. 5 in. and upwardly above the surface of the lead pool about 17 ft. It is seen that this arrangement provides a lateral movement of about 20 feet without loss of height and a pressure increase of 180 p.s.i without requiring any feed leg height. The withdrawal apparatus is similar in design with the exception that the pressures are reversed and the lead levels in the vertical conduits and vessels proper are reversed.

It is seen from the description above that this invention permits any type of granular material to be transferred to or from a low or high pressure region by the use of a high density circulating liquid. This type of seal is operable across a high pressure differential at a minimum loss of height to the unit, with no dilution of the high and low pressure zones from seal gas as occurs in the conventional gravity or pressure gradient type seal leg. The high density liquid can be mercury or an alloy of lead, bismuth, tin and cadmium which can have a minimum melting point of 149° F. and a minimum density of 600 lbs./cu. ft. This type of seal liquid is non-wetting to the particles it contacts because of its high surface tension and cohesive properties and can maintain a seal at minimum seal height because of its high density and stagewise pressure build-up arrangement. The high-density liquid may have a density range of about 50–850 lbs./cu. ft. The liquid will ordinarily have a density of about 600–800 lb./cu. ft. The seal liquid is pumped at a controlled rate into the vertical conduits so that the velocity of the liquid relative to the flowing particles creates a downward drag on the particles overcoming the force of buoyancy of the liquid on the submerged particles.

The particles, upon leaving the vertical conduits within the liquid pools, buoy to the surface unwetted and rise a considerable distance above the surface of the seal liquid due to the buoyant force on the submerged particles in the liquid bath. While the poured density of the particles may range broadly from 10–300 lb./cu. ft., ordinarily the density will be about 30–75 lb./cu. ft. The disengagement zone is made large enough in cross-section so that the velocity of the seal liquid down towards the outlets to the pump is low enough so that its drag on the particles is less than the force of buoyancy of the liquid on the particles. The particles will therefore buoy from the surface of the liquid and will not be dragged down into the pump. The buoyed particles are drained by gravity into the next adjacent vertical conduit and the transfer procedure repeated the desired number of times to obtain the desired lateral transfer and pressure improvement. Any system of level measurement may be used to indicate the top of the catalyst column in each vessel and this signal is connected to any desired controller for adjusting the heavy liquid flow rate through the vertical conduits to maintain constant catalyst column level in each vessel.

The examples and embodiments of the invention given hereinabove are not intended to limit the invention but are provided solely to illustrate the invention. The only limitations intended are found in the attached claims.

I claim:

1. The method of continuously transferring a particle-form material between zones at substantially different pressure which comprises the steps of: maintaining a plurality of vertically elongated pressure-adjustment zones in side-by-side relationship, passing contact material downwardly through vertical passages located in said pressure-adjustment zones and terminated substantially above the bottom of said zones, introducing a liquid having a density substantially greater than the density of the particle-form material into each of said passages in said pressure-adjustment zones to travel concurrently with the particle-form material, maintaining the heavy liquid within each pressure-adjustment zone at a level above the lower end of said vertical passage, controlling the flow rate of heavy liquid in each passage at a rate high enough to discharge particle-form material from the bottom of each passage into said pressure-adjustment zone, whereby the material rises within said zones to predetermined levels, introducing contact material from one of said zones of substantially different pressure to the top of said vertical passage in the first of said pressure-adjustment zones, transferring contact material from said predetermined level of each pressure-adjustment zone to the top of the vertical passage of the next pressure-adjustment zone, transferring contact material from the predetermined level of the last pressure adjustment zone to the other of said zones of substantially different pressure, withdrawing heavy liquid from the bottom of each pressure-adjustment zone to maintain the liquid level substantially constant in each zone, continuously measuring the level of particle-form material in said pressure-adjustment zones and controlling the flow rate of said heavy liquid in each vertical passage in response to said measurements to prevent the level of particle-form material from rising in said pressure-adjustment zones above said predetermined levels and thereby prevent said particle-form material from reaching the bottom of said pressure-adjustment zones, whereby liquid withdrawn from said pressure-adjustment zones is at all times free of particle-form material.

2. Claim 1 further characterized in that the material conveyed is granular material having a poured density of about 10–300 lb./cu. ft. and the heavy liquid is a material having a density of about 50–850 lb./cu. ft.

3. Claim 1 further characterized in that the liquid is molten lead and the particle-form material is granular catalyst.

4. Claim 1 further characterized in that the pressure-adjustment zones are located in lineal arrangement to provide substantial lateral movement of said contact material without substantial loss of vertical height.

5. Claim 1 further characterized in that an inert gas is supplied to the pressure-adjustment zone of highest pressure and gas is transferred from said zone to each succeeding zone to maintain a substantially equal pressure drop between each adjacent pressure-adjustment zone.

6. Claim 1 further characterized in that the liquid collected from each zone is transferred under pressure to the tops of said vertical passages in the pressure-adjustment zones at the correct flow rate to provide the movement of the contact material from zone to zone.

7. An apparatus for continuously transferring particle-form material between locations maintained at substantially different pressures which comprises in combination: a series of vertically elongated chambers located in side-by-side arrangement, vertical passageways located within each chamber and terminated substantially above the bottoms of said chambers, heavy liquid located within the bottom of said chambers and maintained at a level above the bottom of said vertical passageways, means for introducing heavy liquid into the tops of said verticle passageways, at a flow rate adapted to move particle-form material downwardly through said passageways into said chambers, the density of said heavy liquid being substantially greater than the density of said particle-form material whereby the material rises to a level in said chambers a substantial distance above the level of said heavy liquid in said chambers, means for measuring the level of particle-form material in said chambers, valve means located in said means supplying heavy liquid to said passageways in said chambers, operatively connected to said measuring means in said chambers, whereby the level is adjusted below the tops of said chambers, conduit means for supplying particle-form material from one of said zones of substantially different pressure to the top of the passageway in the first of said chambers, conduit means for transferring particle-form material from the column of particle-form material in each chamber to the top of the passageway in the next succeeding chamber, and conduit means for transferring particle-form material from the last chamber to the other of said zones of substantially different pressure.

8. Claim 7 further characterized in that a seal gas is supplied to each member at pressures between those of the zones of substantially different pressure, to maintain the pressure differential between pairs of adjacent chambers substantially equal.

9. Claim 7 further characterized in that the chambers are arranged linearly to effect substantial lateral movement of said particle-form material without loss of elevation.

References Cited in the file of this patent

UNITED STATES PATENTS

| | | |
|---|---|---|
| 2,458,162 | Hagenbaumer | Jan. 4, 1949 |
| 2,547,015 | Kirkbride | Apr. 3, 1951 |
| 2,573,906 | Huff | Nov. 6, 1951 |
| 2,772,224 | Shea | Nov. 27, 1956 |